(12) United States Patent
Wang

(10) Patent No.: US 8,441,575 B2
(45) Date of Patent: May 14, 2013

(54) AUDIO CLOCK REGENERATOR WITH PRECISE PARAMETER TRANSFORMER

(75) Inventor: Hui-Min Wang, Tainan County (TW)

(73) Assignee: Himax Technologies Limited, Tainan (TW)

( * ) Notice: Subject to any disclaimer, the term of this patent is extended or adjusted under 35 U.S.C. 154(b) by 1537 days.

(21) Appl. No.: 11/965,261

(22) Filed: Dec. 27, 2007

(65) Prior Publication Data

US 2009/0167366 A1 Jul. 2, 2009

(51) Int. Cl.
*H04N 7/04* (2006.01)
*H04N 5/04* (2006.01)
*H03B 21/00* (2006.01)
H03B 19/00 (2006.01)
H03L 7/00 (2006.01)
H03M 3/00 (2006.01)

(52) U.S. Cl.
USPC ............ 348/512; 348/513; 348/537; 327/107

(58) Field of Classification Search ............... 348/423.1, 348/457, 512, 524, 537; 375/291, 294, 373, 375/375, 376, 240.28; 327/105, 117; 386/536; 381/168, 108
See application file for complete search history.

(56) References Cited

U.S. PATENT DOCUMENTS

| | | | | |
|---|---|---|---|---|
| 4,180,783 A * | 12/1979 | Khalifa | ............................. | 331/2 |
| 5,180,993 A * | 1/1993 | Dent | ............................. | 331/16 |
| 5,847,615 A * | 12/1998 | Roth | ............................. | 331/16 |
| 7,187,313 B1 * | 3/2007 | Yuan | ............................. | 341/143 |
| 7,283,566 B2 * | 10/2007 | Siemens et al. | ............... | 370/486 |
| 7,317,360 B2 * | 1/2008 | Keaveney | ........................ | 331/16 |
| 7,558,275 B2 * | 7/2009 | Champion | .............. | 370/395.62 |
| 7,558,326 B1 * | 7/2009 | Lyle et al. | ...................... | 375/244 |
| 2002/0145472 A1 * | 10/2002 | Oh | ................................. | 331/1 A |
| 2004/0062334 A1 * | 4/2004 | Poon | ............................. | 375/376 |
| 2004/0080671 A1 * | 4/2004 | Siemens et al. | ............... | 348/473 |
| 2004/0164809 A1 * | 8/2004 | Gibbs | ........................... | 331/1 A |
| 2008/0024661 A1 * | 1/2008 | Tung | ............................. | 348/537 |
| 2008/0061854 A1 * | 3/2008 | Tung et al. | .................... | 327/291 |
| 2008/0129352 A1 * | 6/2008 | Zhang | ........................... | 327/157 |
| 2008/0157879 A1 * | 7/2008 | Petrov et al. | ..................... | 331/16 |
| 2008/0201292 A1 * | 8/2008 | Roethig et al. | .................... | 707/1 |
| 2008/0298532 A1 * | 12/2008 | Wang | ............................. | 375/376 |
| 2009/0167366 A1 * | 7/2009 | Wang | ............................. | 327/105 |
| 2011/0064149 A1 * | 3/2011 | Ejima | ...................... | 375/240.28 |

* cited by examiner

*Primary Examiner* — Pankaj Kumar
*Assistant Examiner* — Reuben M Brown
(74) *Attorney, Agent, or Firm* — Baker & McKenzie LLP

(57) ABSTRACT

It is difficult to implement a conventional phase lock loop circuit in a sink device within an HDMI system because the low frequency input causes the conventional phase lock loop circuit to absorb unnecessary noise during a long waiting period. Therefore, the present invention provides a low jitter clock regenerator comprises: an input clock; a divider to divide said input clock into a slower clock; a phase lock loop circuit to regenerate said slower clock to a reference clock; and a parameter transformer to tune said divider and said phase lock loop circuit to increase the adjustment speed of said phase lock loop circuit. The present invention also provides a method to reorganize parameters in order to create new parameters which are better suitable for a clock recovery circuit in a sink device within an HDMI system.

20 Claims, 2 Drawing Sheets

US 8,441,575 B2

AUDIO CLOCK REGENERATOR WITH PRECISE PARAMETER TRANSFORMER

FIELD OF THE INVENTION

This invention relates to a clock regenerator in a digital transmission system, and more particularly, to a clock recovery circuit with a phase lock loop circuit.

BACKGROUND OF THE INVENTION

There are many standards of data transmission for home use apparatuses. For example, an RF cable is used to transmit TV signals from an antenna to a TV. An S-Video is a data transmission standard to transmit TV signals. There is also another data transmission standard that transmits TV signals with split color components. All these standards transmit signals in analog waveforms. It is commonly known to a person skilled in the art that transmitting signals in analog waveforms creates noise.

In order to overcome such disadvantage and obtain high resolution images, several digital interfaces were introduced, e.g., Digital Visual Interface (DVI) or High-Definition Multimedia Interface (HDMI). The HDMI is the first interface that can carry uncompressed high definition video signals, compressed or uncompressed multi-channel audio signals, and intelligent format and command data. The HDMI specification can be backward compatible to the DVI. Also, tHDMI is highly demanded by movie makers who require protection to their intellectual properties. Moreover, HDMI allows users to control multiple consumer electronic devices with only one remote controller.

To communicate data between two devices digitally, there is a need for an accurate clock to synchronize data signals. There is usually a clock recovery circuit in the reception device that receives the clock from a transmitter device, generates an internal clock, and synchronizes the internal clock with the received clock. Therefore, the reception device can process and deliver the received data without errors. According to the HDMI specification, a clock recovery circuit needs not only to synchronize a received video clock but also to extract an audio clock according to the received video clock and few defined parameters, e.g., Cycle Time Stamp (CTS) and a factor parameter N.

In the pages 75-79 of the High-Definition Multimedia Interface Specification Version 1.2, published on Aug. 22, 2005 by HDMI Licensing, LLC, the requirements for audio sample clock capture and regeneration are defined. The disclosure of which is hereby incorporated herein by reference.

FIG. 1 illustrates an audio clock regeneration model according to the HDMI specification. A source device 11 transmits TMDS (Transmission Minimized Differential Signaling) or video clock to a sink device 12. Meanwhile, a parameter CTS and a parameter N are transmitted within an Audio Clock Regeneration Packet from the source device 11 to the sink device 12. In some video source devices, the audio and video clocks thereof are synchronized. There exists a rational (Integer divided by integer) relationship between these two clocks. In another situation, the audio and video clocks may be asynchronous. According to the HDMI specification, the sink device 12 shall still work in this environment and extract the fractional relationship between these two clocks.

The source device 11 shall first determine the fractional relationship between the video clock and an audio reference clock (128*fs) where fs is an audio sample rate. The source device contains a register 15, a divider 13, and a counter 14 wherein the register 15 keeps the parameter N, the divider 13 divides the audio reference clock by the parameter N, and the counter 14 counts the cycle time of the divided audio reference clock based on the video clock. The exact relationship between the two clocks is described in the following equation:

$$128 * f_s = f_{TMDS\_clock} * N/CTS.$$

The source device 11 sends the numerator and denominator via the HDMI link to the sink device 12. Then, the clock recovery circuit of the sink device 12 includes a divider 16 and a frequency multiplier 17, wherein the divider 16 divides the incoming video (TMDS) clock by the parameter CTS, and the frequency multiplier 17 increases frequency of the divided video (TMDS) clock to N times the original frequency. Finally, a clock with a frequency in an audio frequency range and with synchronization of the received video clock is captured and regenerated.

FIG. 2 illustrates an optional architecture to implement an audio clock regeneration function that takes advantages of the N and CTS values. The frequency multiplier 17 is replaced by a conventional phase lock loop circuit including a phase detector 21, a low-pass filter 22, a VCO (Voltage Controlled Oscillator) 23, and a divider 24. It is well known to those skilled in the art that the conventional phase lock loop circuit can regenerate a synchronized clock. Therefore, the detailed operation of the conventional phase lock loop is ignored herein.

As mentioned in the page 76 of the HDMI specification, the difference in the parameter CTS, due to the asynchronous clocks, creates large jitter. Although the HDMI Specification recommended several N and CTS values, it is still difficult to obtain an audio clock with relatively low jitter. For example, to obtain an audio clock with 32 kHz from a video clock with 25.2 MHz, the parameter CTS would be 25,200 if the N parameter were 4096 as recommended in the HDMI specification. The received video (TMDS) clock in the sink device 12 was divided by the parameter CTS and reduced to 1 kHz before entering the phase lock loop circuit.

The phase lock loop circuit could not adjust itself with a low frequency input, e.g., 1 kHz. The phase detector 21 detects the phase change and forces the low-pass filter 22 to change its voltage level, such that the VCO 23 can send a feedback clock through the divider 24 to the phase detector 21, and update an output clock which is synchronized to the input clock, e.g., the 1 kHz clock. With such a low input clock, the phase lock loop circuit adjusts itself per 1 ms which is the period of a 1 kHz clock. Thus, the accurate requirement 1000 ppm of the HDMI specification can not be achieved easily because the phase lock loop circuit can only adjust its phase slowly and, moreover, noise may accumulate during this 1 ms waiting time.

The optional implementation of the clock recovery circuit in the sink device 12 according to the HDMI specification does not provide a low jitter clock recovery circuit. Therefore, it is an object of the present invention to provide a low jitter clock recovery circuit which also meets the requirements defined in the HDMI specification.

SUMMARY OF THE INVENTION

According to certain embodiments of the invention, a clock regenerator comprising a divider, a phase lock loop circuit, and a parameter transformer generates a recovered audio clock based on a video clock. The parameter transformer recalculates the received parameters, e.g., the parameters CTS and N, and distributes new parameters to the divider and the phase lock loop circuit. The divider divides an input clock into a slower clock which is later regenerated to a reference clock by the phase lock loop circuit. With the recalculation of the parameter transformer, more flexible parameters can be used by the divider and the phase lock loop circuit, and the adjustment speed of the phase lock loop circuit can be enhanced.

According to certain embodiments of the invention, a clock regenerator comprises a parameter transformer which receives a first parameter CTS and a second parameter N, and transforms these received parameters to a first transformed parameter M and a second transformed parameter New N wherein the first transformed parameter M is sent to a divider and the second transformed parameter New N is sent to a phase lock loop circuit.

According to certain embodiments of the invention, a clock regenerator comprises a parameter transformer which receives a first parameter CTS and a second parameter N, and transforms these parameters to a first transformed parameter M, a second transformed parameter New N, and a fine parameter FINE wherein the first transformed parameter M is sent to a divider, and the second transformed parameter New N and the fine parameter FINE are sent to a phase lock loop circuit.

The phase lock loop circuit may further comprise a modulator that controls said phase lock loop circuit to perform fractional frequency synthesis based on the fine parameter FINE. The frequency of the input clock is reduced by said divider, synchronized by said phase lock loop circuit, and tuned by said modulator according to said first transformed parameter, said second transformed parameter and said fine parameter respectively. Moreover, the clock regenerator may further comprise an audio divider to divide the reference clock to an audio clock.

According to certain embodiments of the invention, a clock recovery circuit comprises a parameter transformer and a phase lock loop circuit. The clock recovery circuit receives a video clock and outputs a recovered audio clock based on a fractional relationship between the video clock and the audio clock determined by the parameter transformer. With the determined fractional relationship, the adjustment speed of the phase lock loop circuit can be enhanced.

The clock recovery circuit further comprises a configuration set. The parameter transformer determines the fractional relationship based on the configuration set. The fractional relationship may comprise at least one decimal number. The phase lock loop circuit may comprise a PFD (Phase Frequency Detector), a CP (Charge Pump), a VCO (Voltage Controlled Oscillator), and a divider. The clock recovery circuit may use the sigma-delta modulation phase lock loop architecture to perform the fractional frequency synthesis.

According to certain embodiments of the invention, an HDMI (High-Definition Multimedia Interface) system comprises a source device and a sink device wherein the sink device has a clock recovery circuit. The source device transmits a video clock, a first parameter CTS, and a second parameter N to the sink device. The sink device converts the video clock to an audio clock according to the first parameter CTS and the second parameter N. The sink device contains a parameter transformer which processes the first parameter CTS and the second parameter N and creates a plurality of precise parameters. Therefore, the clock recovery circuit can perform a clock recovery function with fast adjustment speed and low jitter based on the precise parameters.

The clock recovery circuit may be a sigma-delta phase lock loop circuit which has a sigma-delta modulator. The sigma-delta modulator receives one of the precise parameters and controls the sigma-delta phase lock loop circuit such that fractional frequency synthesis can be achieved. Moreover, the precise parameters may contain at least one decimal number.

According to certain embodiments of the invention, a method to recover an audio clock from a video clock in an HDMI system is disclosed herein. The HDMI system contains a source device and a sink device wherein the sink device further comprises a parameter transformer and a phase lock loop circuit. First, the source device transmits a video clock, a first parameter, a second parameter to the parameter transformer of the sink device. Second, the parameter transformer converts the first parameter and the second parameter to a plurality of precise parameters. Finally, the phase lock loop circuit utilizes the precise parameters to increase the adjustment speed and to obtain a regenerated audio clock with low jitter.

The method to recover an audio clock from a video clock in an HDMI system may further comprise a modulator to precisely control the feedback loop of the phase lock loop circuit. The precise parameters may comprise at least one integral number and one decimal number such that the modulator may use the decimal number to perform the fractional frequency synthesis.

DESCRIPTION OF EMBODIMENTS OF THE INVENTION

Figure 1:
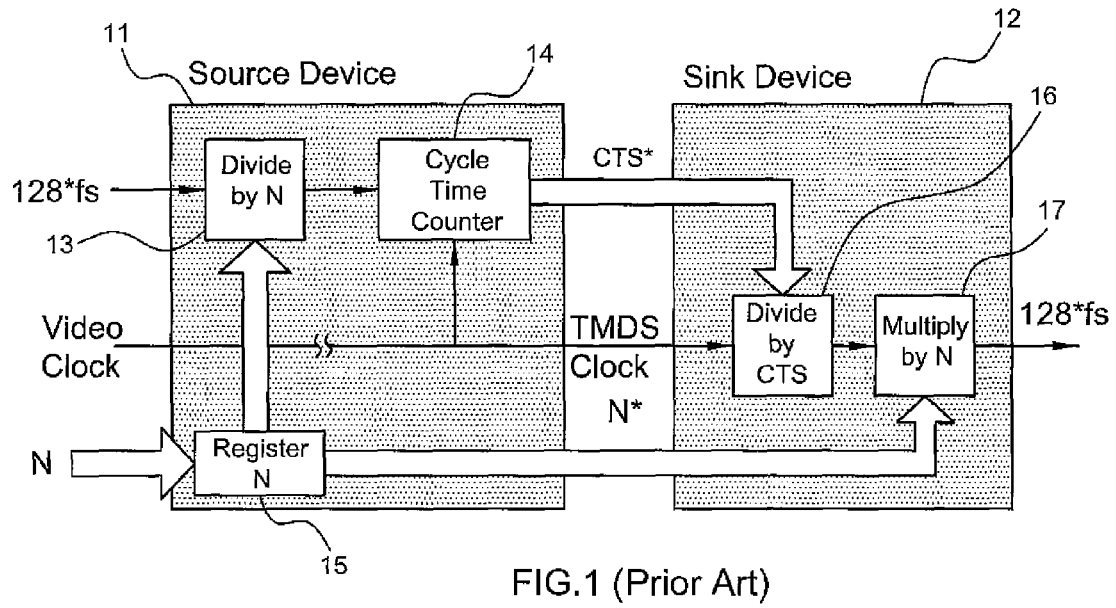
FIG. 1 is a diagram showing an audio clock regeneration model disclosed in the HDMI specification.
Figure 2:
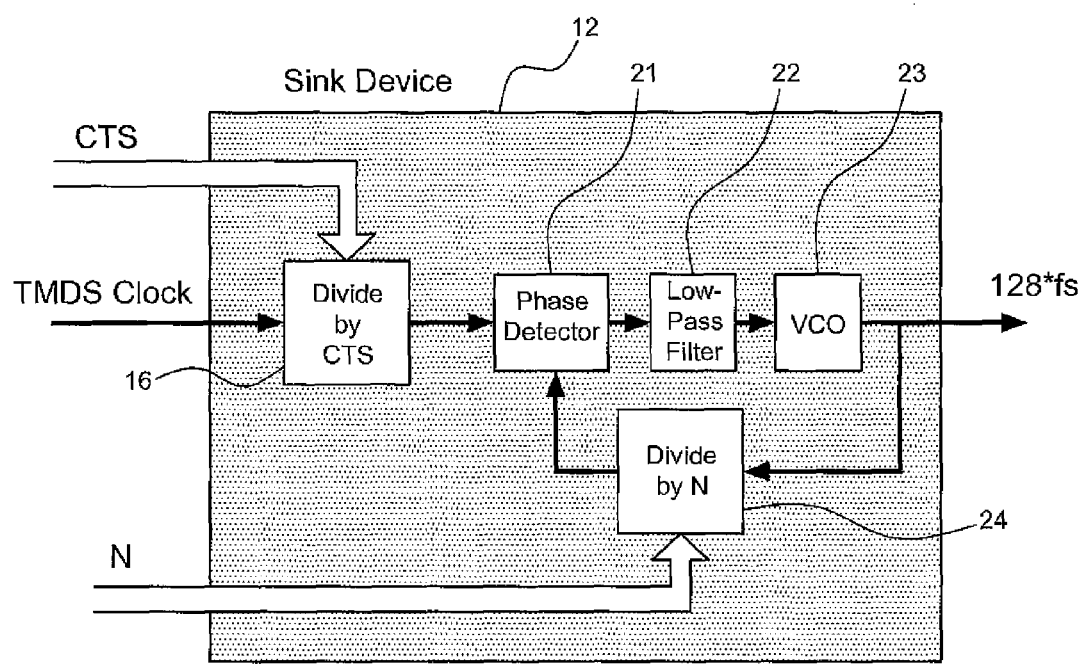
FIG. 2 is a diagram showing an optional implementation of a clock recovery circuit in the sink device suggested in the HDMI specification.
Figure 3:
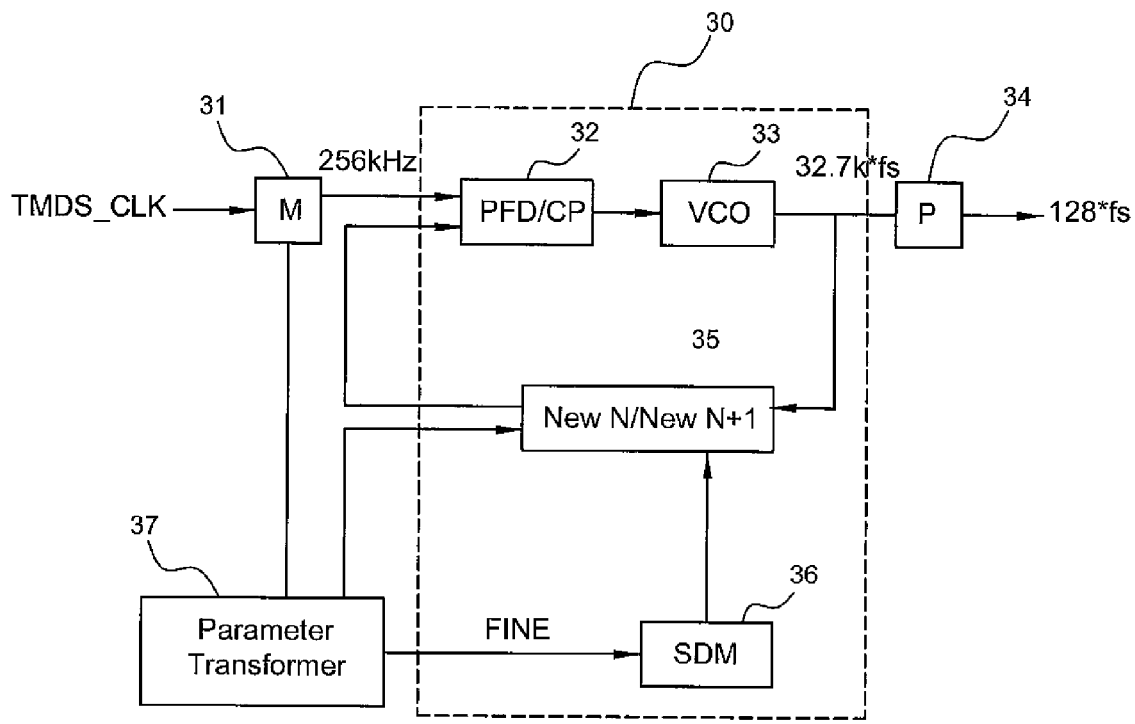
FIG. 3 illustrates a preferred embodiment to obtain a low jitter clock recovery circuit according to the present invention.

FIG. 3 shows an embodiment of a clock regenerator according to the present invention.

The clock regenerator, according to the present embodiment, comprises a first divider 31, a second divider 34, a phase lock loop circuit 30, and a parameter transformer 37 wherein the phase lock loop circuit further comprises a PFD/CP (Phase Frequency Detector/Charge Pump) 32, a VCO (Voltage Controlled Oscillator) 33, and a loop divider 35. In actual implementation, the PFD/CP 32 may be divided into a PFD circuit and a CP circuit. The clock regenerator receives an input clock (TMDS_CLK) and then regenerates an audio clock (128*Fs) which is synchronous to the input clock (TMDS_CLK).

The parameter transformer 37 may contain a plurality of predetermined parameters which provide a fractional relationship between the input clock (TMDS_CLK) and the audio clock (128*Fs). In certain embodiments of the invention, the parameter transformer 37 may receives several parameters defined by the HDMI specification, e.g., parameter CTS and factor N, and converts them to a plurality of precise parameters. These precise parameters may provide a solution such that the phase lock loop circuit can process a clock input within a higher frequency range. Therefore, a regenerated audio clock with low jitter can be achieved.

The phase lock loop circuit may have better design performance because of the reorganization of the predetermined parameters. For example, the frequency of the input clock of the phase lock loop circuit is around 1 kHz in the original HDMI specification. In the embodiment of the present invention, the frequency of the input clock of the phase lock loop circuit may be 256 kHz. Thus, the phase lock loop circuit can quickly adjust the phase difference between the input clock and the regenerated audio clock because the PFD/CP 32 of phase lock loop circuit can detect the phase difference per $4 \times 10^{-3}$ ms instead of 1 ms.

The phase lock loop circuit may be an integral or fractional frequency synthesizer. In certain embodiments, the phase lock loop circuit may use a multi-modulus or multi-phase fractional frequency synthesizer. For those skilled in the art, it would be easy to replace the phase lock loop circuit in FIG. 3 with those various kinds of the frequency synthesizers. Therefore, the details of the embodiments which utilize other type of phase lock loop circuits or frequency synthesizers are ignored herein.

In certain embodiments, the phase lock loop circuit 30 may be a SDM (Sigma-Delta Modulator) phase lock loop circuit wherein the SDM phase lock loop circuit may further comprise an SDM modulator 36 to perform the fractional frequency synthesis. In one embodiment, the parameter transformer 37 may comprise three precise parameters which are two integral parameters M and New N, and one decimal parameter FINE. The parameters M, New N and FINE are transmitted to the first divider 31, the loop divider 35, and the SDM modulator 36 wherein the first divider divides the video clock (TMDS_CLK) by M, the loop divider 35 divides the output of the VCO 33 by parameter New N or (New N+1) and feedback to the PFD/CP 32, and the SDM modulator 36 selects the parameter New N or (New N+1) based on the decimal parameter FINE.

For example, when using the clock regeneration architecture in the prior art, if the input clock (TMDS_CLK) has a frequency 14.318 MHz and the parameter CTS and N are 14,318 and 4,096 respectively, the frequency of the input of the phase lock loop circuit would be 1 kHz. The output of the VCO 33 has a frequency of 4,096 kHz. The 1 kHz input causes the phase lock loop circuit unable to maintain the operation thereof without noise accumulation during the long 1 ms which is the period of a 1 kHz signal.

On the contrary, according to the embodiment of the present invention, the clock regenerator can reorganize the parameters CTS and N, and provide appropriate transformed parameters to the phase lock loop circuit such that the phase lock loop circuit can avoid an input with very low frequency. In one embodiment, if the input clock (TMDS_CLK) has a frequency 14.318 MHz, and the parameters CTS and N are 14,318 and 4,096 respectively, the parameters CTS and N may be converted to transformed parameters M, New N, and FINE wherein the transformed parameters M, New N, and FINE are 55, 4,027, and 0.91451 respectively. Therefore, upon receiving the transformed parameter M, the first divider 31 divides the input clock (TMDS_CLK) to around 260.3 kHz which is about 260 times of the frequency of the input of the phase lock loop circuit in the prior art. Therefore, the phase lock loop circuit may speed up the adjustment of the phase difference between the input clock and the feedback signal of the loop divider 35. The output of the VCO 33 is about 1,048,576 kHz. The second divider 34 divides the frequency of the output of the VCO 33 to the regenerated audio clock (128*Fs). The example mentioned above is only for illustration and a general method to reorganize the parameters will be described later.

Figure 4:
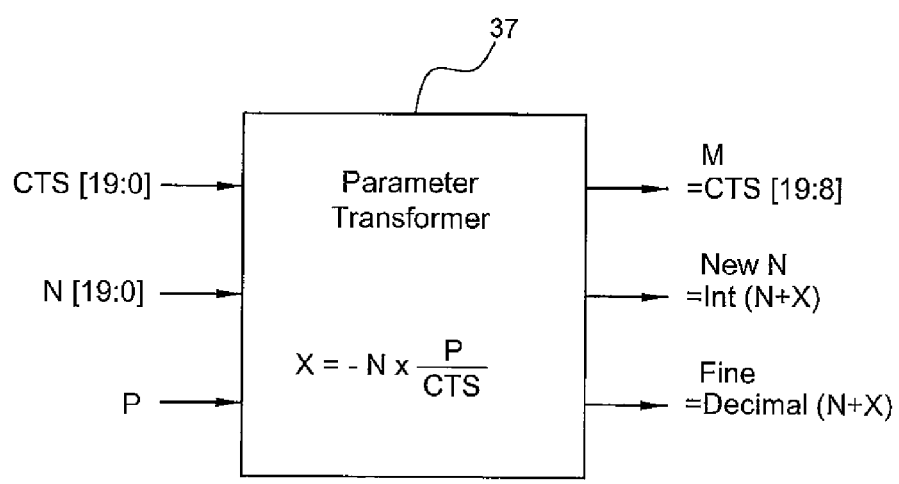
FIG. 4 illustrates the detailed operation of the parameter transformer in FIG. 3.

FIG. 4 illustrates the detailed operation of the parameter transformer 37. In certain embodiments of the invention, the parameter P, CTS and N are represented by digital bits. The transformation may be performed based on the following equation:

$X = -P*(N/CTS)$, wherein the parameter P is a predetermined parameter used by the divider 34 to divide the frequency of the output of the VCO 33 into the frequency within the audio frequency range, and the parameter X is the calculation result based on the equation.

The parameter transformer outputs three transformed parameters M, New N and FINE according to the above equation. For example, if the parameter P is 256, then the transformed parameter M contains the higher bits of the parameter CTS by leaving out the lower 8 bits, the parameter New N contains the integral portion of the sum of the parameters N and X, and the parameter FINE contains the decimal portion of the sum of the parameters N and X. Although other values of the parameter P are possible, it had better simplify the calculation and complexity of the parameter transformer 37 by choosing an appropriate number.

In certain embodiments of the invention, the parameter transformer 37 recalculates the received parameters, e.g., the parameters CTS and N, and distributes new parameters to the divider 31 and the phase lock loop circuit. The divider divides an input clock into a slower clock which is regenerated to a reference clock by the phase lock loop circuit. With the recalculation of the parameter transformer 37, more flexible parameters can be used by the divider 31 and the phase lock loop circuit, and the adjustment speed of the phase lock loop circuit can be enhanced. Moreover, the phase lock loop circuit may have low jitter.

According to certain embodiments, the clock regenerator may use other types of phase lock loop circuit. Therefore, it is possible that a clock regenerator comprises a parameter transformer which receives a first parameter CTS and a second parameter N, and transforms these parameters to a first transformed parameter M and a second transformed parameter New N wherein the first transformed parameter M is sent to a divider and the second transformed parameter New N is sent to a phase lock loop circuit. By carefully choosing the types of the phase lock loop circuit and the parameter P, the phase lock loop architecture may be replaced by other similar circuits.

In certain embodiments, a clock recovery circuit, which has a parameter transformer 37, receives a configuration set. The parameter transformer 37 determines the fractional relationship between the original clock (TMDS_CLK) and the regenerated clock (128*Fs) based on the configuration set. The fractional relationship may comprise at least one decimal number. The phase lock loop circuit may comprise a PFD (Phase Frequency Detector), a CP (Charge Pump), a VCO (Voltage Controlled Oscillator) 33, and a loop divider 35. The clock recovery circuit may use the sigma-delta phase lock loop architecture to perform the fractional frequency synthesis.

In certain embodiments, a clock recovery circuit is used in an HDMI (High-Definition Multimedia Interface) system comprises a source device and a sink device wherein the sink device contains the clock recovery circuit. The source device transmits a video clock, a first parameter CTS, and a second parameter N to the sink device. The sink device converts the video clock to an audio clock according to the first parameter CTS and the second parameter N. The sink device contains a parameter transformer which processes the first parameter CTS and the second parameter N and creates a plurality of precise parameters. Therefore, the clock recovery circuit can perform a clock recovery function with fast adjustment speed and low jitter based on the precise parameters.

A method to recover an audio clock from a video clock in an HDMI system is also disclosed herein. First, the source device transmits a video clock, a first parameter CTS, a second parameter N to the sink device of the HDMI system. Second, the sink device converts the first parameter CTS and the second parameter N to a plurality of precise parameters M, New N and FINE, wherein the precise parameter M is provided to a first divider. Finally, the phase lock loop circuit utilizes the precise parameters to increase the adjustment speed and to obtain a regenerated audio clock with low jitter.

It is to be understood that the embodiments described in this application are not meant as limitations of the invention, but merely exemplary descriptions of the invention. Indeed, different adaptations may be apparent to those skilled in the art without departing from the scope of the annexed claims. For instance, the charge pump of the phase lock loop circuit may be replaced by a loop filter circuit.

What is claimed is:

1. An audio clock regenerator for an HDMI (High-Definition Multimedia Interface) sink device receiving a video clock, and initial parameters including a cycle time stamp value and an initial factor, the audio clock regenerator comprising:
   a parameter transformer configured to:
      compute an equation $X=-P\times(N/CTS)$ to derive an intermediate parameter, wherein X represents the intermediate parameter, P is a predetermined first integer, N represents the initial factor, and CTS represents the cycle time stamp value;
      derive a new factor as an integral portion of the sum of the initial factor and the intermediate parameter;
      derive a fine tune parameter as a decimal portion of the sum of the initial factor and the intermediate parameter; and
      derive a second integer as containing higher bits of the cycle time stamp value;
   a first frequency divider configured to divide the video clock by the second integer;
   a fractional frequency synthesizer configured to receive a result of the division of the video clock by the second integer, and to phase lock a reference clock based on the new factor and the fine tune parameter; and
   a second frequency divider configured to divide the reference clock by the first integer to generate an audio clock.

2. The audio clock regenerator according to claim 1, wherein the parameter transformer is configured to transmit the second integer to the first frequency divider and to transmit the first integer to the second frequency divider.

3. The audio clock regenerator according to claim 1, wherein the parameter transformer is configured to transmit the second integer to the first frequency divider, to transmit the first integer to the second frequency divider, and to transmit the fine tune parameter to the fractional frequency synthesizer.

4. The audio clock regenerator according to claim 3, wherein the fractional frequency synthesizer further comprises a feedback loop in which a modulator is provided, the modulator being adapted to modify the new factor according to the fine tune parameter.

5. The audio clock regenerator as claimed in claim 4, wherein the video clock is reduced by the first frequency divider according to the cycle time stamp value, synchronized by the fractional frequency synthesizer according to the initial factor, and tuned by the modulator according to the fine tune parameter.

6. The audio clock regenerator according to claim 3, wherein the fine tune parameter is a number less than one.

7. An audio clock recovery circuit for an HDMI sink device receiving a video clock, and initial parameters including a cycle time stamp value and an initial factor, the audio clock recovery circuit comprising:
   a parameter transformer configured to:
      compute an equation $X=-P\times(N/CTS)$ to derive an intermediate parameter, wherein X represents the intermediate parameter, P is a predetermined first integer, N represents the initial factor, and CTS represents the cycle time stamp value;
      derive a first and a second adjusted parameter from the sum of the initial factor and the intermediate parameter, the first adjusted parameter being an integer number, and the second adjusted parameter being a decimal number; and
      derive a third adjusted parameter as containing higher bits of the cycle time stamp value, the third adjusted parameter being an integer number;
   a first frequency divider configured to divide the video clock by the third adjusted parameter; and
   a fractional frequency synthesizer configured to receive a result of the division of the video clock by the third adjusted parameter, and to apply the first and second adjusted parameters in a recovery process to regenerate the audio clock from the video clock.

8. The audio clock recovery circuit according to claim 7, wherein the fractional frequency synthesizer comprises a phase frequency detector, a charge pump, a voltage controlled oscillator, and a frequency divider.

9. The audio clock recovery circuit according to claim 8, wherein the fractional frequency synthesizer further comprises:
   a sigma-delta modulator configured to control the frequency divider in order to modify the first adjusted parameter based on the decimal number of the second adjusted parameter.

10. The audio clock recovery circuit according to claim 7, wherein the first adjusted parameter is derived as an integral portion of the sum of the initial factor and the intermediate parameter, and the second adjusted parameter is derived as a decimal portion of the sum of the initial factor and the intermediate parameter.

11. An HDMI system comprising:
   a source device configured to transmit a video clock signal, and initial parameters including a cycle time stamp value and an initial factor; and
   a sink device configured to recover an audio clock signal from the video clock signal, wherein the sink device is configured to:
      derive an intermediate parameter by computing a fractional relationship between a product of the initial factor with a predetermined number and the cycle time stamp value;
      derive a first and a second adjusted parameter from the sum of the initial factor and the intermediate parameter;
      derive a third adjusted parameter from the cycle time stamp value;
      divide the video clock signal by the third adjusted parameter to obtain a slower clock signal;
      apply the first and the second adjusted parameters to lock a phase of a reference clock signal based on the slower clock signal; and
      recover the audio clock signal by dividing the reference clock signal by the predetermined number.

12. The HDMI system according to claim 11, wherein the first adjusted parameter is an integral number, and the second adjusted number is a decimal number.

13. The HDMI system according to claim 12, further comprising:
a modulator configured to control a fractional frequency synthesizer according to the decimal number.

14. The HDMI system according to claim 13, wherein the modulator is a sigma-delta modulator.

15. The HDMI system as claimed in claim 13, wherein the fractional frequency synthesizer comprises a phase frequency detector, a charge pump, a voltage controlled oscillator, and a frequency divider.

16. The HDMI system according to claim 11, wherein the third adjusted parameter is an integer number defined from higher bits of the cycle time stamp value.

17. An audio clock recovery method applied in a sink device of an HDMI system, comprising:
receiving a video clock signal, and initial parameters including a cycle time stamp value and an initial factor from a source device;
deriving an intermediate parameter by computing a fractional relationship between a product of the initial factor with a predetermined number and the cycle time stamp value;
deriving a first and a second adjusted parameter from the sum of the initial factor and the intermediate parameter;
deriving a third adjusted parameter from the cycle time stamp value;
dividing the video clock signal by the third adjusted parameter to obtain a slower clock signal;
through a fractional frequency synthesizer, applying the first and second adjusted parameters to lock a phase of a reference clock signal based on the slower clock signal; and
recovering an audio clock signal by dividing the reference clock signal by the first predetermined number.

18. The audio clock recovery method according to claim 17, wherein the first adjusted parameter is an integral portion of the sum of the initial factor and the intermediate parameter, the second adjusted parameter is a decimal portion of the sum of the initial factor and the intermediate parameter.

19. The audio clock recovery method according to claim 18, wherein the fractional frequency synthesizer includes a feedback loop, and wherein the method further includes modifying the first adjusted parameter according to a decimal value of the second adjusted parameter.

20. The audio clock recovery method according to claim 17, wherein the third adjusted parameter is an integer number defined from higher bits of the cycle time stamp value.

* * * * *